United States Patent [19]
Felcheck et al.

[11] 3,725,870
[45] Apr. 3, 1973

[54] PARALLEL-ACCESS DATA FILE SYSTEM

[75] Inventors: Marvin Felcheck, Monsey, N.Y.; Wallace Kirschner, Trumbull, Conn.; Robert J. Jarosik, Stratford, Conn.; Charles W. Capes, Bethel, Conn.

[73] Assignee: Pitney Bowes-Alpex Inc., Danbury, Conn.

[22] Filed: Dec. 24, 1970

[21] Appl. No.: 101,371

[52] U.S. Cl. ................................340/172.5, 340/152
[51] Int. Cl. ........G06f 7/34, G06f 13/06, G06k 15/20
[58] Field of Search...340/172.5, 149, 150, 152, 154, 340/163; 235/61.7 B, 92 AC

[56] References Cited

UNITED STATES PATENTS

| | | | |
|---|---|---|---|
| 3,314,049 | 4/1967 | Felcheck | 340/172.5 |
| 3,374,486 | 3/1968 | Wanner | 340/172.5 |
| 3,407,388 | 10/1968 | Goldman | 340/152 |
| 3,465,299 | 9/1969 | Schellenberg | 340/172.5 |
| 3,564,499 | 2/1971 | Ryan | 34/147 |
| 3,573,739 | 4/1971 | Zeitlin | 340/172.5 |
| 3,601,805 | 8/1971 | Snook | 340/149 |
| 3,310,782 | 3/1967 | Sinn et al | 340/172.5 |
| 3,337,847 | 8/1967 | Olsson et al. | 340/152 |
| 3,359,541 | 12/1967 | Hunkins et al. | 340/152 |
| 3,534,171 | 10/1970 | Shepard et al | 179/1 |
| 3,509,538 | 4/1970 | Holden et al. | 340/163 |
| 3,596,256 | 7/1971 | Alpert et al. | 340/172.5 |
| 3,513,442 | 5/1970 | Sieracki | 340/154 |
| 3,281,788 | 10/1966 | Hernan et al | 340/152 |
| 3,283,304 | 11/1966 | Sinn et al | 340/152 |
| 3,335,411 | 8/1967 | Sinn | 340/172.5 |
| 3,314,051 | 4/1967 | Willcox et al | 340/172.5 |

*Primary Examiner*—Paul J. Henon
*Assistant Examiner*—Jan E. Rhoads
*Attorney*—Alexander & Dowell

[57] ABSTRACT

A central file system in which information in the form of data associated with identifying operands is stored in random sequence at separate locations of a storage medium, and these locations are cyclically scanned by read/write means at the storage medium. Multiple participating access stations having display means and data-input means are each coupled with their own comparator means, and all comparator means can simultaneously receive the scanned operands and data on an equal priority basis, and compare the operands arriving on-the-fly with operands respectively entered at the associated stations. When coincidence is found at any comparator, the data associated with that operand is temporarily stored for display at the associated station. At the beginning of each storage medium location being read-out, each station seeking coincidence has its search logic reset to assume coincidence for that particular storage location, and then a bit-by-bit on-the-fly comparison is made as the information is read out. If coincidence persists for the whole operand being read from that storage location, the data therein is retained for display. If not, the data is dumped from that station's temporary storage register by replacement with data read-out from the next storage location to be scanned. Any station can update the central storage medium's information by entering a priority mode, in which the other stations are momentarily locked-out from access, and then erasing and/or replacing data in a particular storage medium location.

12 Claims, 5 Drawing Figures

INVENTOR.
MARVIN FELCHECK
WALLACE KIRSCHNER
ROBERT J. JAROSIK
CHARLES W. CAPES by: Alexander & Dowell INVENTOR.
MARVIN FELCHECK
WALLACE KIRSCHNER
ROBERT J. JAROSIK
CHARLES W. CAPES
by: Alexander & Dowell INVENTOR.
MARVIN FELCHECK
WALLACE KIRSCHNER
ROBERT J. JAROSIK
CHARLES W. CAPPS
by Alexander F. Dowell

INVENTOR.
MARVIN FELCHECK
WALLACE KIRSCHNER
ROBERT J. JAROSIK
CHARLES W. CAPES by: Alexander & Dowell

PARALLEL-ACCESS DATA FILE SYSTEM

This invention relates to a data communication system of the type in which a number of remote stations communicate via a computer with a data file for the purpose of requesting certain data stored therein and/or for the purpose of updating the data filed therein.

There are many different kinds of applications in which systems of this type are useful, some using local computer and data storage means and others using large central data processing facilities. Examples of such applications include factory process monitoring and control, ticket reservations, stock quotation systems, department store point-of-sale systems, etc. However, in every case involving a sizeable number of participating remote stations, the access time to the stored data for plural requesting stations is a major consideration. Moreover, since the data is acquired for storage and/or sought by the stations in a random fashion, it cannot be stored according to a predetermined sequence, and therefore, must usually be searched for since its address in the file is unknown.

The time required to perform such searches is also a major consideration affecting the type of storage used. Core systems tend to provide the quickest access time, but the cost per bit of information stored is rather high. In cases where millions of bits of information must be stored, the most economical storage devices are drum or disc memories whose cost per bit is relatively low, but whose access time is high in view of the fact that the information must be serially searched. Most currently available storage drums require about 32 milliseconds to complete one revolution, meaning that average access time even after the correct track has been located is still about 16 milliseconds. This access time would be satisfactory if only a single terminal were seeking access to the information recorded on the track, but in a practical system there may be a great many remote stations simultaneously requesting information from the storage drum, and therefore, queueing time rapidly makes sequential interrogation of the drum by the individual stations unsatisfactory. Commercially available drum systems are of two types, one of which provides a pick-up head for each rotating track, and the other type uses a single pick-up head which moves from track to track. A drum which might be used in a practical installation can have as many as 128 tracks as currently manufactured, and therefore, the cost of the heads and associated amplifiers in a head per track system is rather great. The main drawback to a time sharing system is the waiting time which results when multiple remote stations seek plural different data located on different tracks at the same time.

The present system seeks to use the less expensive drum or disc storage technique while at the same time avoiding the queueing time occurring as a result of multiple remote stations seeking access at the same time. The present system is described and illustrated in terms of a sales-point department store com-puter system in which data relating to sales and customer credit is stored and received from a central computer. A specific example of the type of system in which present invention is applicable is illustrated in copending application, Ser. No. 848,466, now U.S. Pat. No. 3,596,256 filed in the name of Alpert et al on Aug. 8, 1969 and entitled "Transaction Computer System Having Multiple Access Stations," which has been assigned to the assignee of this invention. In the present illustrative embodiments, there are several different practical purposes for which the present system can be used. For example, the stored data itself may relate to the prices of various items on sale, and this price information would then be recorded in the various sectors of the recording medium tracks while being identified by the item inventory number assigned to each different type of item for sale. Another practical purpose is to provide a customer-credit checking file in which individual customers' accounts are stored in the event that the account requires some sort of special handling. The information stored in the various track sectors would be identified according to the customer's account number, and when so identified as a result of a search of the file would provide certain status information, for instance, indicating that the account is overdue and no further credit should be extended to it, or that there was a limit of $50.00 on each sale made on the account, or that the credit card representing that account is a stolen card and should be confiscated, or that it is a lost card, etc. The accounts requiring no special handling may not be stored at all upon this credit file drum, and in such a case there would probably be a continuous flow of accounts onto the drum and off of it as the credit status of the various accounts changes from time to time.

In view of the fact that the remote stations in such a department store system are the cash registers of the store, it is more than likely that a sizeable number of remote stations will be accessing the data files at any particular moment and that it is therefore important to reduce queueing time as much as possible with respect to these stations. The present invention is illustrated in terms of a credit card checking system which is used in conjunction with a larger point of sales system into which purchases are entered via remote stations, and in which credit status is checked every time a card is used to make a purchase. Therefore, rapid access to the information on the credit file drum is essential.

It is a principal object of the present invention to use a relatively less expensive storage medium such as a drum or a disc in which the necessary searching for particular stored information is serially conducted, while at the same time providing an improved system in which many remote stations can access the storage medium to obtain data stored therein without developing a noticeable waiting time for such access. In order to accomplish this purpose, the storage drum system continuously reads out all information stored thereon at a high rate of speed, and each remote station has the means for capturing the required information on-the-fly as it is read out from the storage medium without stopping the medium at the desired sector and without interfering with the capability of any other remote station to acquire the information which it seeks when such information is read out at a different instant of time, or even when the same information is read out at the same time.

It is another important object of the invention to provide in association with each remote station suitable comparison logic which compares the information being read from the track and sector with information entered into the remote station, and recognizes the desired information by finding coincidence between the two above mentioned bit streams serving to identify the sector having the desired information data. Since the information being read from the storage medium goes to all remote stations simultaneously in parallel, the number of such stations using the drum at any particular moment is of no consequence to the system and does not result in queueing of the various data seeking stations. When a remote station finds the desired information, it takes it directly from the storage medium as the information is read out without affecting the performance of any of the other remote terminals.

In view of the fact that the data on the drum is not representative of permanent conditions, but instead represents temporary and changing conditions, especially when used as a credit-check file, it is a major object of this invention to provide a system in which the stored information can be erased or otherwise updated while the system is performing its normal point-of-sales functions and without seriously interrupting the same. Ordinarily, each remote station performs a search routine looking for information stored in the file by searching for coincidence between inserted credit account numbers and the credit account numbers located on the credit file drum and serving to identify its various sectors, the system reading out the data in the appropriate sector once it has been located by coincidence. On the other hand, the remote stations are also capable of operation in a "priority" mode in which they are either searching for an identified sector so as to erase the data contained therein, or else searching to identify a certain sector in order to write new data therein, perhaps in an empty sector. It is an important object of the present invention to provide a system in which such updating can be accomplished on-line without stopping the drum and without seriously delaying its use by other stations seeking information contained on the drum. This is accomplished by locking out all other stations temporarily when any one of the stations is changed into the priority mode of operation, and maintaining the other stations locked out until the updating has been completed. The present system has its own track and sector counters by which each information storing sector of the drum or disc memory is identified as the drum rotates from an initial position. The outputs of these counts are available to all remote terminals, and any terminal when entering the priority mode to update a sector can use these counters to note the address of the sector being updated once coincidence between the identifying bits has been established, so that upon arrival at that same sector on a subsequent revolution the priority-mode station can make the desired change.

It is another object of the invention to provide a system in which the updating information is manually entered at a selected station prior to the correction of the drum, and only after the manual entry has been completed at the remote station is that station then thrown into the priority mode, i.e. just long enough for actual writing of the information on the drum to be accomplished. By this means, the other remote stations are not locked out from access to the drum while the new information is being typed into the station which is about to make the correction. When the entry of the updating information on the drum has been completed and the station is released from the priority mode, the system automatically returns to its normal operation giving parallel access once again to all remote stations.

The identification recorded in each memory sector, for instance in the present example comprising the customer's credit account number, is of fixed format, for instance eight digits. These digits can be entered serially on the remote station's keyboard by the sales person, and the digits go into a circulating storage buffer where they are retained while comparing them bit-by-bit with the bit stream of identification account numbers being read from the sectors of the memory file as the drum rotates. The present invention assumes at the outset that each such comparison will be successful, but when the account number in the buffer fails to coincide with the account number being read from a sector in any one of its bits, a flipflop is set in that particular remote station indicating failure of coincidence. This negative type of operation has the advantage of permitting the account number being typed into a remote terminal to be compared bit-by-bit each time a new digit is added so that the number is being continuously checked as the digits are inserted. Naturally, coincidence in every bit cannot occur until the entire account number has been typed into the unit, but by permitting continuous checking of the number as it is entered, when coincidence does occur the information will be immediately retrieved from the drum even before the operator has time to remove his finger from the last key and press the "enter" button. There is usually a substantial delay between entry of the account number and pressing of the "enter" button due to the fact that the operator will pause to read the entered account number on his station's display and make sure that it is correct before pressing the "enter" button. This pause is sufficient to permit the desired data to be captured and contained within the register of the remote station by the time the operator presses the "enter" button so that the result of the search appears to be instantaneously presented to the operator when he presses the "enter" button without requiring any wait on his part to determine the status of the customer's credit. Of course, if the operator actually entered the wrong number, and therefore, must press the "erase" button on his register instead of the "enter" button, the incorrect information will never be displayed to the operator, but will be discarded. The procedure whereby the account number is continuously checked as it is entered digit-by-digit allows the computer feeding the file to free itself from having to store the complete number before transmission thereof to the file, thereby allowing more time and storage capability for use for other purposes and programs.

Other objects and advantages of the invention will become apparent during the following discussion of the drawings, wherein.

Figure 1:
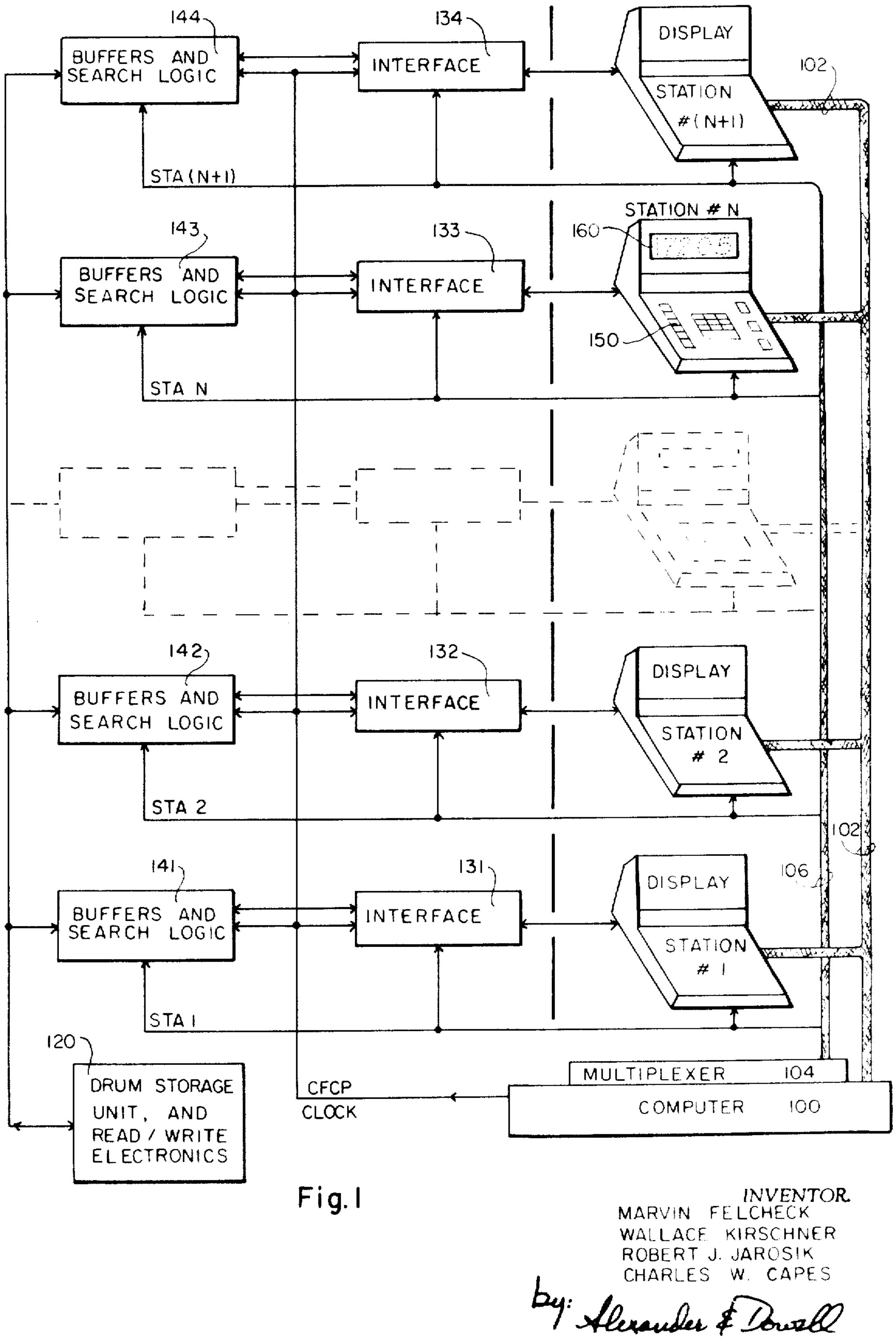
FIG. 1 is a block diagram of a multiple remote station computer transaction system to which a parallel access storage file system according to the present invention has been added.

Referring now to FIG. 1, this figure shows an already existing multiple remote-station computer system located on the right-hand side of the drawing in combination with the present invention which provides additional data file information storage and retrieval capability, in this illustrative embodiment used for storing credit account status information. As stated above in copending patent application Ser. No. 848,466, owned by the assignee of this invention, there is shown a point-of-sales register and computer system in which a plurality of remote stations are located about a department store and are all connected to a central computer 100 through a data bus 102. These remote stations are labelled station No. 1, station No. 2, . . . station No. N, and station No. (N + 1). The computer 100 is further associated with a multiplexer 104 which is used to time-share the computer with the various remote stations. The multiplexer 104 is shown connected via a cable 106 to each of the remote stations so that the multiplexer can cyclically enable these stations one at a time. The multiplexer puts out a STA 1 signal to enable station No. 1, a STA 2 signal to enable station No. 2, and STA N signal to enable station No. N, etc. A practical system may include any number of remote stations, one working embodiment of the present system including an installation of 32 stations in a department store.

Figures 2, 5:
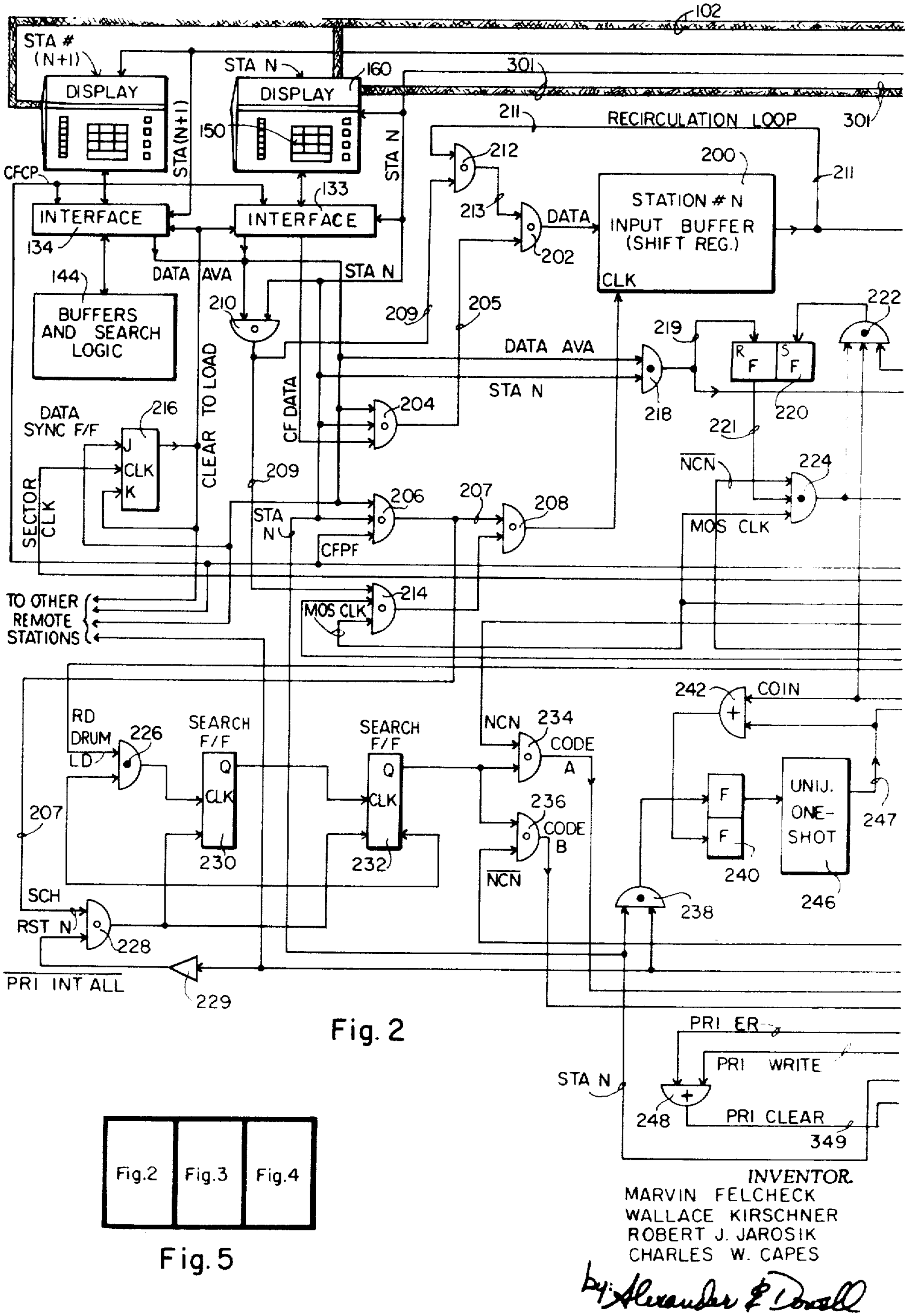
FIGS. 2, 3 and 4 are more detailed block diagrams showing a parallel access data file system according to the invention.
FIG. 5 is a diagram showing how FIGS. 2, 3 and 4 should be mutually oriented to show a complete embodiment of the present invention.
Figure 3:
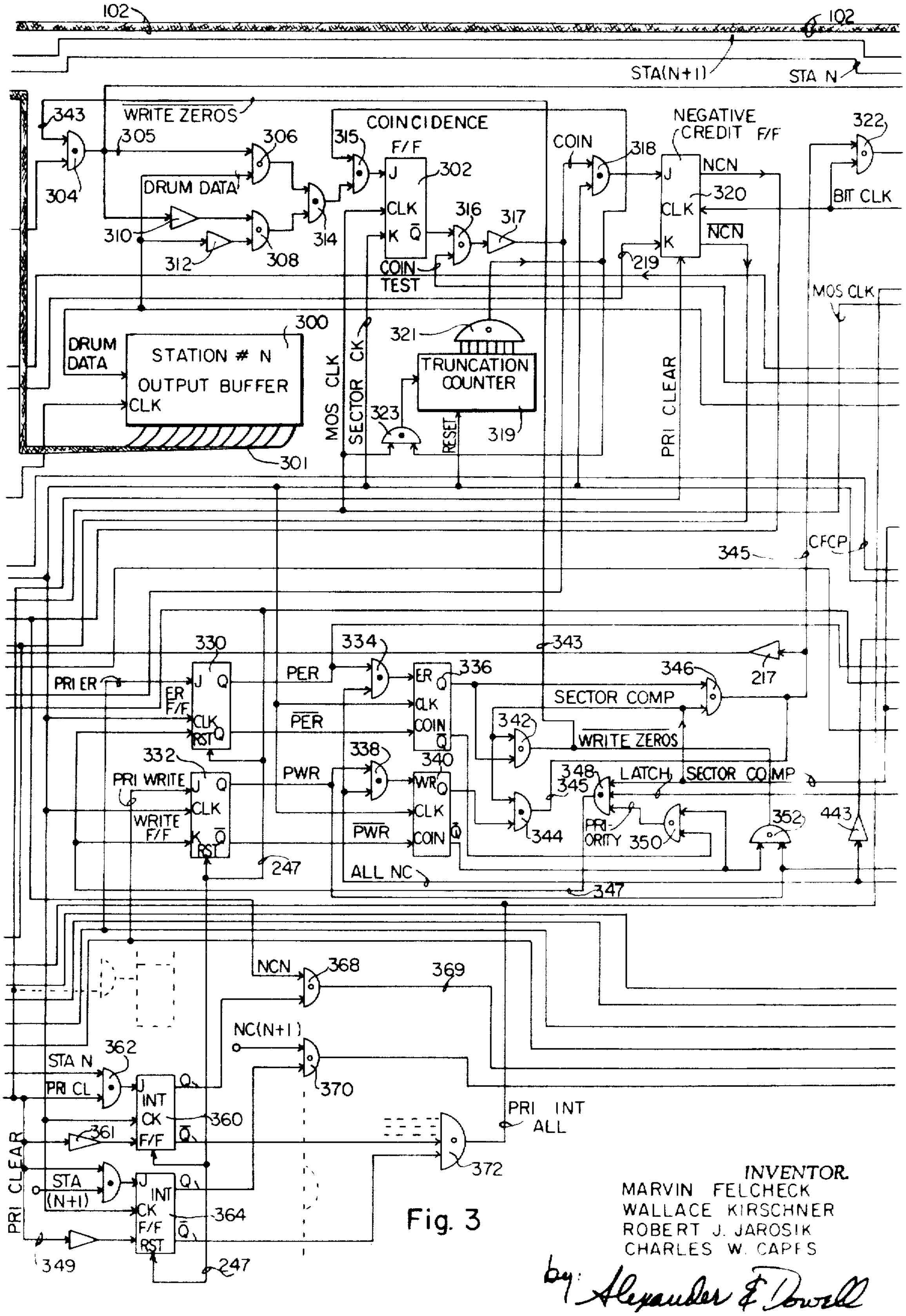
Figure 4:
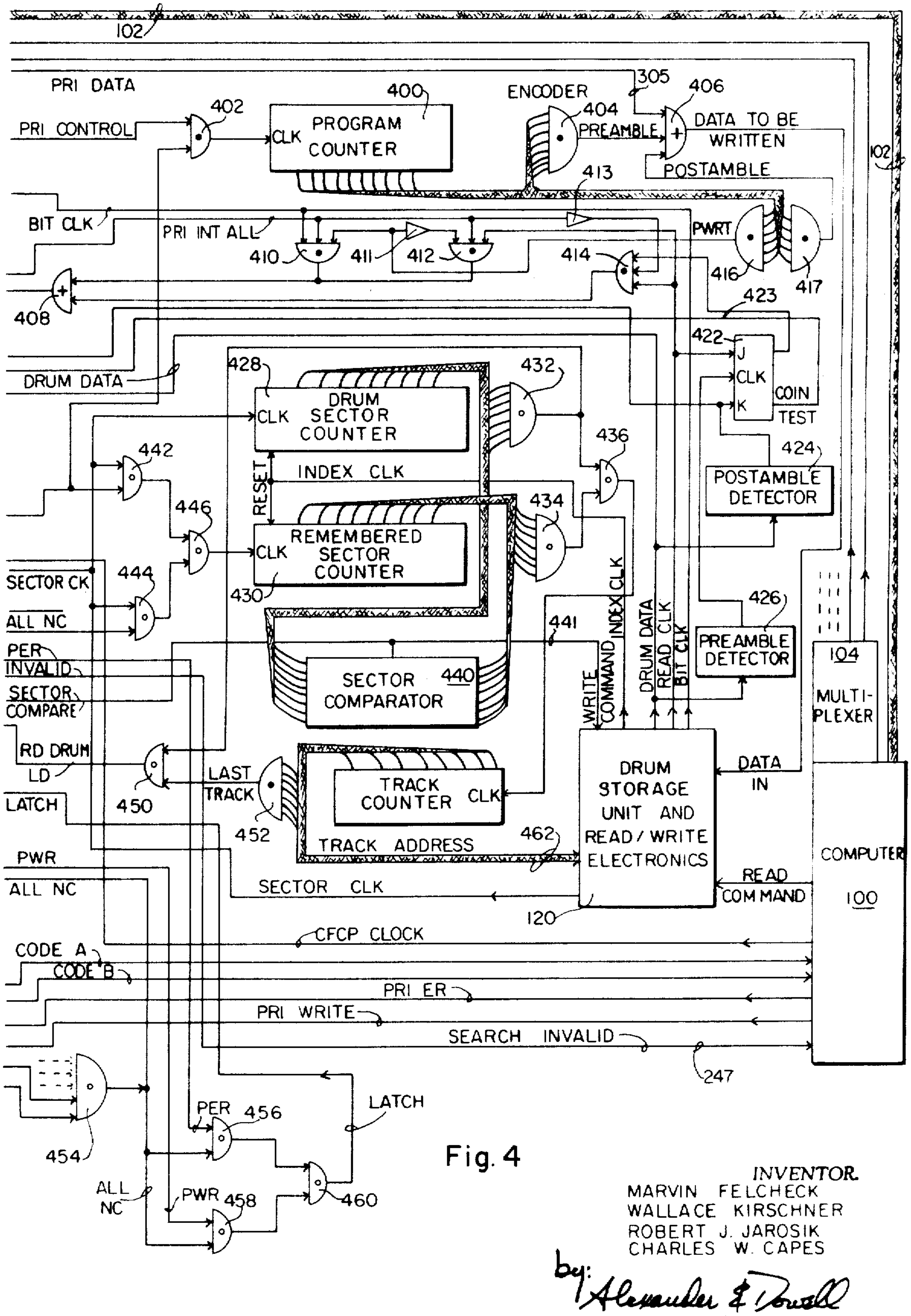

In the left-hand portion of FIG. 1 there is shown the present data file system comprising a drum memory unit 120 which includes not only the mechanical features of a drum memory, but also includes suitable drum electronics for handling data and commands and for keeping track of the various drum-position pulses which are recorded on the drum and which help to read information into and out of storage. The entire drum memory unit including the drum electronics is a purchased item, the particular one being used at the present time in the applicant's manufactured systems being made by Datum Incorporated, California Peripherals Division, identified as their series No. 88 Drum Memory. The drum memory unit 120 can be accessed both for the purpose of introducing and/or retrieving information by any suitable keyboard device, such as a teletypewriter. In view of the fact that each of the remote stations shown in FIG. 1 already has a keyboard 150 as well as a display 160 included in it, the present system employs these features of the various remote stations rather than introducing separate keyboard devices. Moreover, since the various stations are selected one at a time by the multiplexer 104, the present system is also coupled to use this same multiplexer for the purpose of time sharing the drum memory unit 120. In general, the present data file system, which in this illustrative example is assumed to be used for checking the status of customer credit accounts, is provided with suitable interface means 131, 132, . . . 133 and 134 corresponding with the various input and display stations 1 through (N + 1) exclusive. It will be recalled that one of the principal objects of the present invention is to permit all of the remote stations to communicate with the drum memory file unit 120 so rapidly that they all appear to their various operators to have simultaneous access. The means by which such communication takes place includes in association with each remote station certain buffers and search logic circuits 141, 142, . . . 143 and 144. The details of one such circuit by which the station No. N communicates with the drum memory unit 120 are shown in FIGS. 2, 3, and 4 which should be mutually oriented as shown in FIG. 5 in order to provide a composite diagram. These figures will presently be discussed in relation to the basic remote-station computer system, parts of which are repeated in FIGS. 2, 3 and 4, which include several of the remote stations N and (N + 1) near the upper left-hand corner of FIG. 2, and on the right side of FIG. 4 include the computer 100, the multiplexer 104, and the data bus 102 which is connected with said remote stations. Before discussing the illustrative embodiment of FIGS. 2, 3 and 4 in detail, a brief summary of the salient points of the operation will be provided as follows:

SUMMARY OF OPERATION

The drum in the memory unit 120 rotates continuously and is scanned by suitable reading and writing heads at its various tracks and sectors. The information from one sector of one track at a time is read out from the unit 120 on the DRUM DATA line which connects in parallel with all of the buffers and search logic which cooperate with the respective remote stations. For the most part what is shown on FIGS. 2 and 3 comprises the contents of the Buffers And Storage Logic 143 serving station No. N through the Interface 133. The stations communicate information through the intervening interface into the associated buffer and search logic, and the use of this information generally involves a search to find whether there is a sector of the drum unit 120 having corresponding information. The Buffers and Search Logic 143 for the station No. N as shown in FIGS. 2 and 3 includes an input buffer 200 for receiving information from the corresponding remote station to be loaded into the system, and includes in association with each remote terminal an output buffer 300 to be used for receiving data from the drum unit 120. The format of the information recorded on the drum in each sector includes a preamble, followed by the identifier operand, followed by data, followed by a postamble. When a certain operand corresponding with a customer's credit account number is loaded into an output buffer, a search is conducted to locate a sector containing the same identifier operand by comparing the operand in the input buffer 200 bit-by-bit with the memory data stream arriving on the DRUM DATA line from the drum unit 120. Coincidence between the operand entered by the operator via the keyboard 150, or an automatic card reader (not shown), at the station No. N and the operand being read from the drum unit 120 is noted by a flipflop 302. As each sector has its identifier operand simultaneously read out in parallel to each and every station, when coincidence is noted by the flipflop 302 at any particular station the output buffer 300 of that station stops admitting data and retains the data read from the sector enjoying coincidence with the identifier operand entered into its input buffer 200. The contents of the output buffer 300 then represents the desired information data which in this example informs the operator of the status of the customer's credit. This desired information is displayed on the display 160 of the station No. N. In view of the fact that information is always read from the drum unit 120 continuously in parallel to all of the remote stations, whenever a station captures on-the-fly the information it requires, it retains it without affecting the capability of any other station to obtain the information which it seeks whenever it can find coincidence.

Moreover, the information entered into the input buffer 200 via the keyboard of the associated station can be used to find and alter the information contained on the drum unit 120, either to erase it, or else to enter data in an otherwise unoccupied sector of the drum. When the operator at the terminal has entered data for this purpose into the input buffer 200, he then enters a request to the computer to change the system from its normal mode of operation into a priority mode which has the effect of blocking out all the other remote stations and resetting all of their logic to zero so that they have to start over again in searching for coincidence with operands contained within their input buffers. During this priority mode interval only the remote station initiating the priority mode has access to the drum unit 120, and then only for the purpose of changing its content. Assuming that a certain identifier operand is being searched for by the station operating in the priority mode, the sector containing the information on this credit account will be located when, during the reading out of the contents of the drum to the station No. N, the operand arriving on the DRUM DATA line coincides with the operand contained in the input buffer 200. Such coincidence has the effect of recording in the sector and track counters shown near the middle of FIG. 4 the correct address of the sector in which the information is located. The present content of the sector can then be erased. This is accomplished by writing all zeros into the sector the next time the drum comes around and the address of that particular sector matches the address remembered in the sector and track counters shown near the center of FIG. 4. When this erasure has been made, the system then leaves the priority mode and returns to its NORMAL retrieval mode by restoring the capability of all of the remote stations to search for coincidence between the operands which they may have entered into their respective input buffers 200, i.e. by comparing this operand bit-by-bit with the operand being currently read from the drum unit 120, and then retaining the data stored in the same sector in which coincidence was found. New information can be added to an empty sector of the drum by searching for coincidence between all zeros and the operand bit positions of sectors, until an empty sector is located. Then on the next revolution of the drum, data is written into the empty sector from the station's input buffer 200, which data was earlier loaded into the buffer from the keyboard 150. Since the multiplexer 104 actually enables the operation of only one remote station at a time, there is certain circuitry which can appear only once in the system and can be connected in parallel to all of the Buffer and Search Logic circuitry 141, 142, . . . 143 and 144 as well as all of the Interfaces 131, 132, . . . 133 and 134. These common units are for the most part illustrated in FIG. 4.

As mentioned above the drum storage unit 120 as purchased from the manufacturer is a complete package having certain inputs and outputs. Among the inputs are a WRITE COMMAND input, an input data signal labelled DATA IN, a READ COMMAND input, and an ADDRESS bus 462. Among the outputs is a DRUM DATA output, and 4 different clock pulses which are generated internally as the drum rotates since the clock pulses are actually recorded on the drum in a permanent manner. The first of these outputs is an INDEX CLK pulse which signals the beginning of each new track of the drum, i.e. at track number 1, track number 2, . . . , etc. The second output clock pulse is the SECTOR CLK which appears to mark the beginning of each new sector. The third output is a BIT CLK which is delivered by the drum for each bit position which can be recorded within each sector regardless of the nature of the bit, and the fourth output is a READ CLK pulse which is similar to the bit clock output except that the READ CLK occurs only during data bits which can be read from the drum and not during non-data positions of the drum. Thus, there are fewer READ CLK pulses than there are BIT CLK pulses.

As background, it should also be noted that there are certain inputs and outputs to and from the computer 100. Two of the inputs to the computer comprise code A and code B inputs which inform the computer as to the current status of a search being conducted by any of the remote stations using its circuitry shown in FIGS. 2 and 3. The code A signal means that the search has been completed by that particular station and that it has found coincidence between the credit account number operand entered into the system by the clerk and a credit account number operand recorded in a sector of the drum unit 120. A code B signal means that it has searched the drum and has not found coincidence, meaning that the operand is not found on the drum and therefore that credit account is not subject to any special handling but appears to be satisfactory. Another input to the computer is an INVALID input on the wire 247 coming from the flipflop 246 which indicates that the search has not produced satisfactory results even though the search has been conducted for at least one complete search of the drum unit 120, as will be explained hereinafter. The computer also has certain other outputs including a READ COMMAND directed into the drum unit 120, and two priority mode commands which operate in response to a request for the priority mode from whichever of the remote stations is currently selected by the multiplexer 104. These priority signals are labelled PRI ERASE and PRI WRITE.

LOADING THE INPUT BUFFER

It should be noted at this point that each of the remote stations may be in one of three possible modes with respect to the data file system. Some of the input stations are probably not using the facility at all and therefore can be said to be in an OFF mode. Some of the remote terminals may be searching for the purpose of locating and retrieving data from the drum storage unit 120, and these stations can be said to be operating in a NORMAL mode wherein each conducts its own search and captures desired data without affecting what is being done by any of the other stations. The third mode is the PRIORITY mode in which the drum storage file is taken over by one of the stations for updating its information, in which case all of the other stations are locked-out for the duration of the PRIORITY mode operation. When this occurs, the station initiating the priority mode does so for the purpose of erasing and/or writing something with respect to the drum storage unit 120. The present portion of the disclosure is concerned with the NORMAL mode of operation which will be explained with respect to station No. N.

When the operator at station No. N seeks to determine whether or not a particular credit account number requires special handling and is therefore listed in the drum storage unit 120, he will load the credit account number as an identifier operand into the input buffer 200 which then retains and circulates that account number synchronously with the motion of the drum for the purpose of comparing it with the account numbers being read cyclically from the sectors of the storage drum 120 as identifier operands which appear on the DRUM DATA line. The operator uses the keyboard 150 of his station to enter the credit account number through the Interface 133 into the input buffer 200 for station No. N. The Interface 133 contains buffers and logic sufficient to receive the account number and to cooperate with the logic shown in FIGS. 2 and 3 which is operative at that remote station for the purpose of making the search and retrieving the information from the drum storage unit 120. The Interface 133 receives the account number and signals that it has information available by putting out a signal on the DATA AVA line. The DATA AVA line is a bus wire common to all remote units, and when one or more of the interfaces 131, 132, . . . 133 or 134 raises the DATA AVA line to a high level it thereby indicates that one or more of the stations has data available to be loaded into its input buffer 200. Subsequently, when the multiplexer 104 selects that particular remote station, for instance, by energizing the STA N wire to a high level to select the station No. N, the effect is to enable certain inputs to the gates located in FIG. 2 below the interface 133. Thus, the NAND gate 210 is fully enabled, and the NAND gates 204 and 206 have their upper inputs enabled when station No. N is selected. In this specification, the NAND gate is an inverting AND gate in which the output level is low when all inputs are high, and the output level is high when any or all inputs are low. The NAND gate is shown in the drawings as having a circle inside it. The gate 204 therefore passes the binary ones of the credit account number which are leaving the interface 133 in serial form via the wire CF DATA, and since as each binary one passes all of the inputs to the gate 204 are high, the CF DATA comes out on the wire 205 in inverted form. However, by passing through the NAND gate 202 the data is re-inverted as it is entered into station No. N input buffer 200 which is a shift register. The upper input to the gate 202 is maintained at a high level by the gate 212 which is operative only as a re-circulation loop gate, and whose lower input is maintained at present at low level by the signal from the output of gate 210. The NAND gate 206, whose upper two inputs are also high when data is available and station No. N is selected passes clock pulses CFCP from the computer 100 which controls the keyboard sending the data to the input buffer. Each time a pulse appears as a one on the gate 206 the output on wire 207 goes low, but the pulse is subsequently re-inverted as it passes through the NAND gate 208 whose lower input is high because the gate 214 is blocked. The output on wire 207 is also used to reset the search flipflops 230 and 232 which keep track of the status of the search which will be subsequently conducted by that particular remote station. This output on wire 207 is labelled SCH RST N and its operation will be hereinafter discussed. Each CFCP clock pulse therefore passes through the NAND gates 206 and 208 and into the clock terminal of the input buffer 200 to clock the CF DATA thereinto. It is by this means that the input buffer 200 is loaded with the credit account number entered at the keyboard 150 as an identifier operand together with any information data associated therewith. Also, the AND gate 218 has been enabled to put out an output on wire 219 to reset the flipflops 220 and 320 for the purposes hereinafter stated. When the keyboard has finished loading its information, the data available wire DATA AVA goes low and remains in that condition, thereby placing a high on the wire 209 to the gate 212, and on the upper input to the gate 214 while at the same time disabling the gates 204, 206 and 218.

However, it is to be noted that the data entered into the station No. N input buffer 200 from the interface 133 cannot be entered at just any time which may be randomly selected. Therefore, a data synchronizing flipflop 216 is used to prevent all of the interfaces, such as the interfaces 133, from delivering data to their respective input buffers until the beginning of a new sector. When data becomes available at an interface, thus energizing the DATA AVA bus, this availability signal is entered into the J input of the data sync flipflop 216. The next time that the drum unit 120 begins a new sector, the SECTOR CLK pulse will toggle the flipflop 216 to provide an output on the CLEAR TO LOAD wire which comprises an enabling wire going to all of the interfaces. Thus, the data is 67 from the interface into the input buffer beginning at the beginning of the next new sector. The CLEAR TO LOAD wire also connects to the K input of the flipflop 216 so that the next SECTOR CLK pulse resets the flipflop and removes the CLEAR TO LOAD signal. All the time that the input buffer 200 at this particular station No. N is being loaded, the drum storage unit 120 is reading out data on the DRUM DATA line to all of the other stations operating in the NORMAL mode, and this data is thus continuously available to them independent of what station No. N is doing. Meanwhile at station No. N it becomes the purpose of the search logic shown in FIGS. 2 and 3 to compare the information loaded into the input buffer 200 with the DRUM DATA which is being read from the drum unit 120, and especially to seek on-the-fly coincidence between the identifier operand representing the customer's credit account number contained in the input buffer 200 and the operands representing stored credit account numbers being read from the drum unit as each sector passes the read heads, which are a part of the drum storage unit 120.

SEARCH FOR COINCIDENCE

The progress of the search being conducted in each of the remote stations is kept track of by two search flipflops 230 and 232 located at each station. When both flipflops are reset, no search is being conducted. Resetting occurs via the gate 228 whenever the system is not in the PRIORITY mode so that the lower terminal of the gate 228 is enabled by an inverted signal labelled NOT PRI INT ALL, which comes from the inverter 229 and will be more fully explained hereinafter. As stated above, the clock pulses from the CFPF wire appear in inverted condition on the wire 207 whenever new information is being loaded into the input buffer 200 and these inverted pulses are channeled on the wire 207 into the gate 228 to provide reset signals for the flipflops 230 and 232. These signals are labelled SCH RST N, and comprise a whole series of pulses, any one of which is adequate to reset both flipflops 230 and 232. In other words, as long as data is being loaded into the input buffer 200 from the interface 133 the clock pulses continuously reset the search flipflops. However, the search reset signals on wire 207 disappear when the loading of data into the input buffer has been completed, at which time the lower output of the flipflop 232 enables the lower input to the AND gate 226. The upper input to this gate occurs once per complete cycle of the drum storage unit 120, this input being labelled RD DRUM LD, the conditions under which it is generated being described hereinafter. At any rate, when a new search cycle is about to begin the latter signal is delivered from the AND gate 226 to the clock terminal of the JK flipflop 230 to set it. The next RD DRUM LD signal through the gate 226 resets the flipflop 230, and the trailing edge of its Q input sets the flipflop 232, disabling the gate 226. The Q output of the flipflop 232 provides a high signal to enable one input each of the gates 234 and 236. Thereafter, a code A signal will appear when the NCN input to gate 234 is high, meaning that the search for coincidence was successful, or a code B signal will appear when the NOT NCN input to the gate 236 is high, meaning that coincidence has not yet been found.

For the purpose of searching for coincidence between what is in the station N input buffer 200 and what is being read from the drum storage via the DRUM DATA line it is necessary to recirculate the contents of the input buffer once per sector, and in synchronism with the time when the storage drum 120 is reading the identifier operand from the drum. In view of the fact that the DATA AVA signal is now removed from the gate 210, its output goes high and enables the AND gate 212. Each bit clocked out of the input buffer therefore is returned through the NAND gate 212 and the re-circulation loop wire 211, and is reinverted by the NAND gate 202 whose lower input is high because the output of the gate 204 is also high now that the DATA AVA signal is low. The output of the input buffer 200 then is permitted to circulate and feed back into the same input buffer. However, it is not the CFCP CLK pulse which is used to clock this circulation, but instead a signal is derived from the READ CLK pulse coming from the drum unit 120. It should be recalled that the READ CLK pulses only occur during the bit positions of the drum sectors which contain the operand and data information, and therefore these read pulses will exactly circulate all the data in the input register 200 which is provided with exactly the same number of bit positions. It should also be recalled that the storage drum records all of the operand and data information in each sector between an encoded preamble and an encoded postamble each of which comprises a characterizing series of zeros and ones. Since the READ CLK pulses occur only between the preamble and the postamble, the input buffer will circulate its data in each new sector during this same interval. In FIG. 4 a PREAMBLE DETECTOR 426 serves to recognize the preamble and to deliver an output used to clock the JK flipflop 422. This flipflop is then set by the next READ CLK pulse, and delivers an output on wire 423 to enable the AND gate 414, another input to which is enabled through an inverter 413 since the system is not in the priority interrupt mode at present. The third input to this gate 414 comprises the READ CLK pulses which are then clocked through the gate and through an OR gate 408 to deliver MOS CLK pulses to the gates 214 which pulses are used inter alia to clock the input buffer 200 during re-circulation. These MOS CLK pulses are permitted to pass through the NAND gate 214 since the output of gate 210 on wire 209 is also high because of the fact that the DATA AVA signal to gate 210 is low. These MOS CLK pulses coincide in time with the READ CLK pulses from the drum.

These MOS CLK pulses also serve to clock the station N output buffer 300 through the gate 224 to admit data being read from the drum during each sector into the output buffer 300 as will be more fully discussed hereinafter. Note that the input terminal to the output buffer is the DRUM DATA taken directly from the drum storage unit 120. Summarizing, just as the drum enters the information portion of each sector after the preamble has been detected by the detector 426, the flipflop 422 is set to permit MOS CLK pulses to pass through the gates 214 and 224 so that they can be used to clock both station N buffers 200 and 300. When the postamble is subsequently detected by POSTAMBLE DETECTOR 424, its output resets the flipflop 422 thereby disabling the MOS CLK pulses and at the same time enabling the coincidence testing system by energizing the wire labelled COIN TEST. The gate 224 is enabled at its upper terminal to clock the output buffer 300 by the NOT wire NCN as long as coincidence has not been found yet, and at its center terminal by the reset output of the flipflop 220 which was reset when the DATA AVA signal and the STA N signal appeared in the gate 218 while new data was being loaded into the input buffer 200. The clocking of the buffer 300 will be presently discussed in greater detail.

Coincidence is determined by comparing the data being read from the drum on the DRUM DATA line with the data being recirculated in the input buffer 200. This comparison is made in the vicinity of the upper portion of FIG. 3 wherein the DRUM DATA signal is compared with the output of the AND gate 304 on the wire 305 leading to the NAND gates 306 and 308. The upper terminal of the gate 304 is high because the NOT WRITE ZEROS signal from the gate 342 is high, thereby enabling gate 304 to pass output from the input buffer 200. The flipflop 302 is reset at the beginning of each sector to assume coincidence of the bits on the DRUM DATA line with the bits on the wire 305. The NAND gates 306 and 308 receive these bits, the latter through inverters 310 and 312, and the output of the gates 306 and 308 go to be combined in a hard wired gate 314. This gate 314 has a high output so long as both inputs are high, but if either input goes low its output is dragged down to a low level which will not set the flipflop 302. As long as the data matches, bit by bit, the output of one of the gates 306 or 308 will be low, so the flipflop 302 won't be set. However, when incoming bits fail to match, both gates 306 and 308 will go high and the output from gate 314 will go high so that it can toggle the coincidence flipflop 302 to remove its NOT-Q signal from the gate 316 so that coincidence failure is signalled as soon as a COIN TEST signal appears at the gate 316 when the flipflop 422 is toggled to its reset position by the POSTAMBLE detected by the gate 424. The AND gate 315 is enabled only during the operand by the Truncation Counter 319 which uses the MOS CLK (Read) pulses to count up a number equal to the number of bits in the operand. The NAND Decoder 321 puts out a high signal to the AND gates 315 and 323 until the counter 319 reaches its full count at the end of the operand. Then its output goes low and blocks the gate 315 and the gate 323 to stop the count. The next sector clock pulse resets the coincidence flipflop 302 to resume the assumption of coincidence occurring in the next sector of the drum as it is read out, and resets the Truncation Counter 319.

If the operand bits in the input buffer 200 match the operand being read from the storage unit 120, the coincidence flipflop will remain reset. In this case the gate 316 will have a high signal on its upper input which will provide a low signal at its output when the COIN TEST signal goes high at the end of the next sector, and this low signal output will then be reversed to a high output on the coincidence wire COIN appearing on the other side of the inverter 317. The coincidence wire COIN is coupled to an AND gate 318 which receives a sector clock pulse at the beginning of the next sector to set the negative credit flipflop 320 and provide an output on the negative credit wire NCN. This output NCN indicates that coincidence has been found and that there is therefore some qualification of the account represented by that operand number. The NCN signal enables the NAND gate 234 and applies a code A signal into the computer 100 indicating that the status of the credit account is in doubt. The negative credit flipflop 320 is not reset until the next time that new data is loaded into the input buffer 200, this reset signal on wire 219 coming from the gate 218 as a result of the simultaneous presence of the DATA AVA signal and the STA N signal.

Conversely, if no coincidence was found, meaning that the drum was searched but the operand representing that credit account number was not found upon it, then the COIN wire would remain at low level which upon occurrence of the SECTOR CLK pulse would fail to set the negative credit flipflop 320 thereby leaving it unset. The flipflop is actuated by the bit clock to either set or reset if it has appropriate inputs to accomplish this purpose. If the negative credit flipflop remains reset then a signal will remain on the NOT NCN wire which signal is delivered to the NAND gate 236, where it will be combined with the Q output of the search flipflop 232 to provide a code B signal informing the computer that the search of the drum has thus far failed to find the account number, meaning that the customer's credit enjoys a satisfactory status.

Summarizing, the drum storage unit 120 continuously reads out the data in each sector as the sector is scanned and this data appears on the DRUM DATA wire which goes to the comparison gates 306 and 308. At the beginning of each sector after the preamble is detected by the detector 426 the flipflop 422 begins passing read clock pulses through the gate 214 to clock the input buffer in step with the reading of data from the drum. This data circulates in the circulation loop 211 and also enters the comparison gates 306 and 308. At the beginning of each sector the coincidence flipflop 302 is set to assume that coincidence will exist. As long as the gates 306 and 308 find coincidence in both the binary one and the binary zero levels of the bits entering thereinto the coincidence flipflop remains reset. At the end of the sector the flipflop 422 is reset by the postamble and a COIN TEST signal will enable the gate 316 to test whether coincidence was found. If it was found, the customer's credit is in doubt and the negative credit flipflop is set, but if it was not found, the customer's account is enjoying a satisfactory status and the negative credit flipflop remains reset to provide output on the NOT NCN wire. This coincidence test produces either a code A signal from the gate 234 or a code B signal from the gate 236, but the absence of a signal from either gate indicates that no search is being conducted. The code A or the code B signal then persists continuously until new data is entered into the buffer 200 through the interface 133 resulting in an SCH RST N signal passing through the gate 228 and resetting the search flipflops preparatory for making a search on the newly entered data.

Referring now to the output buffer, the purpose of this buffer is to continuously retain the data which was taken from a sector in which coincidence with the identifier operand has been found. The system as described above always initially assumes that coincidence will exist between the input buffer operand and the operand being read from each sector, and is reversed only upon failure of coincidence. Thus, the negative credit flipflop is normally reset to provide an output on the NOT NCN wire. This output is high and enables the MOS CLK pulses from the gate 414 to pass through the gate 224 and clock the DRUM DATA into the output buffer 300. This data is continuously clocked through the buffer for the portion of each sector during which negative coincidence exists, the data which was clocked from the previous sector into the output buffer 300 being simply pushed out of it by data arriving from the presently scanned sector so long as coincidence is not found and the flipflop 220 remains reset from the last time data was loaded into the input buffer 200 from the keyboard 150. However, when actual coincidence occurs, it becomes desirable at the end of that same sector to block any further DRUM DATA from being entered into the output buffer 300, so as to prevent loss of the data just captured therein. Thus, the gate 224 is used to block MOS CLK pulses from being supplied to the output buffer 300 so that no further DRUM DATA can be clocked through that buffer. The captured data will therefore remain in the output buffer 300 until an operator loads new data into the input buffer from the interface 133 to start a new transaction. At this time the DATA AVA signal and the STA N signal will again pass through the gate 218 and reset the flipflop 220 so as to provide on the wire 221 an enable signal to the AND gate 224 and allow new data to enter the output buffer 300 as long as lack of coincidence maintains an output on the NOT NCN wire to the gate 224 thereby enabling its other input and permitting the MOS CLK pulses to pass therethrough. The flipflop 220 is set to block the gate 224 whenever coincidence enables the COIN wire to gate 222 and the postamble is detected in the same sector. The data thus captured in the output buffer 300, and indicating the reason for, and status of, the credit account, is read out onto the bus 301 which then applies the data to the display in the station No. N register so that the operator can see the reason for the difficulty with the account, or the limitation imposed upon that account.

PRIORITY MODE UPDATING DRUM

In order for a data file system of the present type to have maximum utility for the persons using it, its information must be kept up-to-date. This is especially true where the data file system is a credit file in which the numbers of credit accounts which do not enjoy a satisfactory status are listed. Such accounts are highly fluid in nature and must be added to or removed from the credit file whenever the status changes, so that the treatment of the customer seeking to use his credit account will be appropriate. As stated above in the objects of this invention, there are various reasons why a particular customer's account may be listed in the negative credit file. For instance, his account may be unpaid, or his credit card may be lost or stolen, or he may have a limitation placed upon the size of any purchase which can be made using this account, etc. Keeping these accounts up-to-date in the drum storage unit 120 is something which is so important that updating the information must be done at frequent intervals during a normal business day and such updating is therefore awarded priority over the normal routine searching of the drum file by the various remote units to determine status of selected accounts, and in particular to determine whether or not these accounts appear on the negative credit drum at all. For this purpose, the system is operable in a PRIORITY MODE which can be selected by an operator at any remote station. In order to enter such a mode, the operator keys into the keyboard at the station a certain coded number serving as a request to the computer and informing it that that particular station wishes to enter the PRIORITY MODE. This request leaves the remote station, in this case, station No. N and travels along the input bus 102 going to the computer to inform it as to what has been requested to be done. In general, there are two different PRIORITY MODES, one of which is an erase mode in which the operator merely seeks to completely erase the account from the credit file drum by entering all zeros into the sector in which the account presently appears. The other is a write mode used to write information into a sector which is now empty and contains all zeros. The operator then enters his request for priority mode, and the next time that that particular station is selected by the multiplexer, by the appearance of an STA N signal, the system will commence functioning toward that purpose.

Having entered by an appropriate code number his request to the computer, the operator then enters the credit account information and loads it into the input buffer 200 by the means already described above under the heading LOADING THE INPUT BUFFER. The system then initiates a search by setting the search flipflops 230 and 232 the next time the drum commences a new cycle, and a search is conducted which results either in finding coincidence, meaning that the negative credit flipflop 320 becomes set and an output appears on the NCN wire, or else the system is unable to find coincidence and the negative credit flipflop remains unset providing an output on the NOT NCN wire. Therefore, either a code A or else a code B signal will appear at the output of one of the gates 234 or 236, and will be delivered to the computer. If it is a code B signal that occurs, showing that the account cannot be found on the drum, the computer will then return a priority write signal PRI WRITE so that the operator can enter the account number in an empty sector together with whatever information data may be appropriate. On the other hand, if the code A signal appears indicating that the account has been found on the drum, the computer can then decide which mode to enter. If the account is to be completely removed, a signal will appear on the priority erase wire PRI ER. Whichever of these two signals code A or code B appears the command signal from the computer passes through the OR gate 248 and produces a priority clear signal PRI CLEAR, and this signal is then fed to one gate associated with each remote station, such as the gates 362 and 366 near the bottom of FIG. 3. Since station No. N is particularly illustrated in the drawing, the PRI CLEAR signal enters the gate 362 and is combined with the multiplexer signal STA N. In the gate 366 the PRI CLEAR signal will be combined with the STA (N+1) signal at a later time. However, returning to the current discussion of station No. N, when the STA N signal appears together with the PRI CLEAR signal, these signals will set the interrupt flipflop 360, thereby removing the NOT Q signal therefrom and entering a Q signal into the gate 368. The NOT Q signals from all of the priority interrupt flipflops such as 360 and 364 are all delivered to the NAND gate 372. The gate normally puts out a low signal on the PRI INT ALL wire because all of its inputs are high, but when one of the interrupt flipflops such as the flipflop 360 has its NOT Q signal go low, the PRI INT ALL signal goes high, and this signal is used to prevent any of the remote terminals from conducting a search for coincidence, while at the same time resetting their search logic. For example, the high PRI INT ALL signal is inverted in the inverter 229 and enters the gate 228, and resets the search flipflops 230 and 232 regardless of whatever stage of searching that station may currently be in. The PRI INT ALL signal passes through the gate 238 and sets the flipflop 240 for reasons which will be hereinafter stated. The PRI INT ALL signal also enables the gates 410 and 412 for the purpose of providing a MOS CLK signal as will be presently discussed.

The priority clear signal PRI CLEAR coming from the gate 248 on the wire 249 is connected to all remote terminals and resets all of their negative credit flipflops 320 so that when the next search is conducted after the PRIORITY MODE is concluded, each flipflop will start out in the correct condition of conductivity. Thus, all of the remote stations are stopped from conducting further searches and have their coincidence circuitry reset, whenever any one of the stations goes into a PRIORITY MODE. In addition to clearing and resetting all remote terminals, the PRI ER and PRI WRITE signals also set appropriate flipflops 330 or 332 in order to keep track of which PRIORITY MODE is currently being performed by the local station. If a priority erase signal PRI ER appears, the next sector clock pulse SECTOR CLK will clock the signal to set the erase flipflop 330, and if the priority write mode is commanded by the computer the PRI WRITE signal sets the flipflop 332 upon arrival of the next SECTOR CLK pulse. These flipflops remain set so long as the system is in one or the other of the PRIORITY MODES. The two flipflops are of course never simultaneously employed.

In searching for the correct sector of the drum unit 120, namely the sector matching the operand number contained in the input buffer 200, it becomes necessary to identify the track and sector at which the change must be made. For this purpose, a set of three counters is used as shown near the center of FIG. 4. These counters operate to serve any remote terminal which has entered the PRIORITY MODE in view of the fact that only one such terminal can be in this mode at any particular moment. There is a DRUM SECTOR COUNTER 428 which keeps pace with the present position of the rotating storage drum 120; and there is a REMEMBERED SECTOR COUNTER 430 which starts out in step with the DRUM SECTOR COUNTER 428, but can be stopped to remember the address of a sector in which coincidence occurred. There is also a TRACK COUNTER which is stepped forward to the next track each time both sector counters have completed one revolution. The occurrence of the INDEX CLK at the beginning of the first track and sector of the drum resets both of the sector counters 428 and 430 and starts them counting in step. It will be recalled that the interrupt flipflop 360 is already set, and therefore the lower terminal of NAND gate 368 is high. However, the upper terminal is low because there is no NCN signal, and therefore the output on the wire 369 to the NAND gate 454 is high. Accordingly, the ALL NC wire will be low and when this low signal is inverted in the inverter 443 it will enable the NAND gate 444 at its lower input. The upper input to the NAND gate 446 is high, because the sector compare signal on the gate 442 is still low, and therefore the sector clock pulse SECTOR CLK will pass through the gate 446 to step the REMEMBERED SECTOR COUNTER while at the same time the SECTOR CLK pulse is also stepping the DRUM SECTOR COUNTER 428. As a result, both the sector counters 428 and 430 are stepped along in unison while the search logic is searching for coincidence between the bits appearing on wire 305 and the operands stored in the drum unit 120. When coincidence is detected, the negative credit flipflop 320 will be set, thereby putting an output signal on the wire NCN. As a result, there is a low output on the wire 369 which actuates the NAND gate 454 to raise the ALL NC wire to a high condition. As a result, the gate 444 is blocked and the REMEMBERED SECTOR COUNTER 430 stops counting and remembers the sector number in which coincidence was detected. Note that the clock pulse which advances the TRACK COUNTER comes from a gate 436 which receives the outputs of the gates 432 and 434. The gate 432 detects the occurrence of the last sector count of DRUM SECTOR COUNTER 428 and the gate 434 detects the last sector count of the REMEMBERED SECTOR COUNTER 430. Since the counter 430 is now stopped, there will no longer be coincidence between the last count of the counter 428 and the count of the counter 430, and therefore there will be no further output pulses from the gate 436 to advance the TRACK COUNTER 438. Therefore, the TRACK COUNTER 438 also stops counting while retaining the number of the track in which the coincident sector was located.

Returning to the center of FIG. 3, and recalling that the ALL NC line is high, this line will enable the lower inputs to the gates 334 and 338 so that whichever of the flipflops 330 or 332 was set by the computer will then be able to set the coincidence flipflop 336 or 340. If the computer is operating in the PRIORITY ERASE mode, the Q output of the erase flipflop 330 on the wire PER will pass through the gate 334 and set the flipflop 336, which then remembers that coincidence has been found. Conversely, if the computer has commanded a PRIORITY WRITE mode so that the flipflop 332 has been set, the Q output of that flipflop on the wire marked PWR will set the erase coincidence flipflop 340 through the gate 338.

ERASE

Having found coincidence, the REMEMBERED SECTOR COUNTER 430 and the TRACK COUNTER 438 stop counting and remember the exact location of the coincidence, while the DRUM SECTOR COUNTER 428 continues to count with the drum as it rotates. Since the present discussion concerns the erase function, assume that it was the erase coincidence flipflop 336 that was set when coincidence was located and the sector and track counters 430 and 438 were stopped. A SECTOR COMPARATOR 440 continuously compares the rotating sector position as currently indicated by the DRUM SECTOR COUNTER 428 with the remembered coincident sector position as remembered by the counter 430, and this comparison is made as the drum rotates in an effort to determine when the drum has returned to the same sector in which coincidence was originally found. The track address is fed from the TRACK COUNTER 438 into the drum storage unit 120 on the bus wires 462, and this address is used to prevent changing of tracks in the drum storage unit 120 as long as the track counter 438 is locked up at the address at which coincidence has been found. Consequently, when the drum position as determined by the counter 428 reaches the same sector which is being remembered by the counter 430 the SECTOR COMPARATOR 440 will deliver an output on the wire 441 which is introduced into the drum storage 120 as a WRITE COMMAND. This same signal also comprises a SECTOR COMPARE signal which is delivered to gates 342, 344, 346, 348, 402 and 442 to enable one input of each at the time when the drum in the memory unit 120 has now returned to the beginning of the sector in which coincidence was obtained during its previous revolution, this being the sector which is to be erased according to the present mode of operation as indicated by the setting of the flipflop 336. The command to priority erase amounts to a command to WRITE ZEROS, and for this purpose the occurrence of the SECTOR COMPARE signal enables one input to each of the gates 342, 344 and 346. The lower input to the NAND gate 342 goes high because the erase coincidence flipflop 336 is set, and therefore, the NOT WRITE ZEROS signal goes low on the wire 343. This places a low signal on the AND gate 304 regardless of what is on its lower terminal. As a matter of fact the input buffer 200 actually continues to circulate while zeros are being written, but since its output to the gate 304 is merely being delivered to a blocked gate, such circulation is a futile though altogether permissible occurrence.

The appearance of the SECTOR COMPARE signal also serves another purpose, namely to enable the gate 442 at its lower input so that on the next rotation of the drum, when a sector clock pulse arrives the REMEMBERED SECTOR COUNTER 430 will begin stepping together with the DRUM SECTOR COUNTER 428.

The SECTOR COMPARE signal also energizes the lower input to the gate 402, and the upper terminal to this gate is energized by BIT CLK pulses on the PRI CONTROL wire which are fed through the gate 322 when its upper terminal is energized. In the ERASE mode the enabling of the upper input is accomplished by the gate 346 whose upper input is energized by the Q output of the ERASE COINCIDENCE flipflop 336, while its lower input is energized by the SECTOR COMPARE wire. Thus, the PROGRAM COUNTER 400 now begins counting upwardly in response to the bit clock pulses applied to its clock input. This counter is used to establish the PREAMBLE, the OPERAND, the INFORMATION DATA, and the POSTAMBLE format by which the sectors are recorded. The counter 400 first counts a certain number of preamble positions. During this count the encoder 404 reads out a preamble through the gate 406 and into the DATA IN terminal of the drum storage unit 120. This preamble in the present embodiment comprises 6 zeros followed by a binary one.

The decoder 416 now decodes the Operand Bit positions of the total count of the counter 400 which follow the preamble and preceed the Data Bit positions. The decoder 416 puts an enable signal on the PWRT line during the Operand to enable one input of the gate 410 and disable the gate 412 through the inverter 411. Another input to this gate is the PRI INT ALL input indicating that the system is in the priority mode. When the PWRT signal is present, the gate 410 is therefore active and passes the BIT CLK through it to the OR gate 408 to clock the MOS CLK input to the gate 214 which presently has a high appearing on wire 209, thereby allowing the input counter 200 to be counted upwardly in order to clear it by allowing information previously loaded thereinto to be dumped at the other end of the buffer. At the same time, zeros from the wire 305 are passed through the OR gate 406 into the DATA IN line of the drum storage unit 120, thereby replacing any information following the preamble with zeros. After a certain count has been reached by the program counter 400, the PWRT signal disappears thereby enabling the gate 412 during the Data Bit positions to deliver Read Clock pulses. Finally, a postamble is decoded from the POSTAMBLE ENCODER 417 and passed through the OR gate 406 into the DATA IN terminal of the drum storage unit 120. Thus, the entire sector has been obliterated, having been erased by the entry of zeros.

It is the next occurrence of the sector clock pulse which resets the system and takes it out of the priority mode. In the lower left-hand corner of FIG. 4 there are a plurality of gates labelled 456, 458 and 460 which create a LATCH signal. If the system is erasing, the gate 456 is enabled and if the system is writing the gate 458 is used. Since the present section deals with erasing, it will be noted that the upper input to the gate 456 is energized by the PER signal coming from the flipflop 330, and that the lower input to the gate 456 is energized by the ALL NC signal coming from the gate 368 and the gate 454. These two signals, being high, produce a low at the output of the gate 456, which produces a high LATCH signal at the output of gate 460. The LATCH signal is applied to the center input of AND gate 348, whose upper input is still energized by the SECTOR COMPARE signal. The lower input to the gate 348 is energized because the system is presently in the priority mode as indicated by the fact that both COINCIDENCE FLIPFLOPS 336 and 340 at present do not have a NOT Q output. Therefore, the wire 347 is high, and this wire is applied to the K terminals of the flipflops 330 and 332, only the former of which is set. Upon the next occurrence of the sector clock pulse, the flipflop 330 is toggled back to reset condition, thereby resetting the ERASE COINCIDENCE FLIPFLOP 336 also. The system is now taken out of the priority mode by the resetting of the flipflops 330 and 336, and in the meanwhile the computer has removed its PRI ER signal from the OR gate 248, thereby removing the PRI CLEAR signal from the wire 349. The return of this signal to the low level resets the interrupt flipflop 360 through the inverter 361 and thereby returns the PRI INT ALL signal to its low level. This signal then re-enables the gate 228 through the inverter 229 to produce a high which remains on the gate 228 so that new search information can be subsequently loaded into the input buffer 200 by the operator as discussed above under the heading LOADING THE INPUT BUFFER.

WRITE

The priority WRITE mode is used for the purpose of entering new data into a drum sector which is already blank. Therefore, the process is reversed. As described above, during the ERASE process an operand loaded into the input buffer 200 was compared with what was on the drum to find a certain coincident sector, and then zeros were read into the sector to erase it. In the WRITE mode zeros are used for comparison with the operands being read from the drum in order to find an empty sector, and then having found an empty sector, on the next revolution of the drum the contents of the input buffer 200 are read into the same sector to occupy it. The contents of the input buffer must therefore include both an operand and whatever data is to be entered into the sector as identified by that particular operand. Since the computer now instructs the system to write instead of to erase, the computer delivers a PRI WRITE signal to the gate 248 which then places a PRI CLEAR signal on the wire 349, this signal combining with the STA N signal to energize the gate 362 and set the interrupt flipflop 360 for the station No. N. The setting of this flipflop places a PRI INT ALL signal at the output of gate 372. The PRI INT ALL signal resets the search flipflops 230 and 232, and enables one input to each of the MOS CLK gates 410 and 412, but through the inverter 413 it disables gate 414 which is operative only in the non-priority mode. In addition, the PRI WRITE signal from the computer sets the WRITE flipflop 332 which then enables the upper inputs to the gates 338 and 458 as well as the right hand input to the gate 352. The left-hand input to gate 352 is still enabled because the WRITE COINCIDENCE flipflop 340 is not set, the gate 352 will drag the NOT WRITE ZEROS line down to a low-level, thereby blocking the gate 304 and putting zeros on the line 305. This low level will then be compared with the operand inputs from the Drum Data line in the gate 308. This comparison made in the gates 306 and 308 with all zeros when the drum comes to an empty sector, provides high outputs to the gate 314 which sets the COINCIDENCE flipflop 302. During the next COIN TEST signal on gate 316, a coincidence output occurs which passes through the gate 318 and on the next sector clock pulse sets the negative credit flipflop 320. The NCN output signal from this flipflop energizes the gate 368 to put out a low signal on the wire 369 which in turn actuates the NAND gate 454 and raises the ALL NC wire to a high level, thereby to enable the lower input to the gate 458 which puts out a low level to enable the LATCH wire through the NAND gate 460. The ALL NC signal passes through the inverter 443 and blocks the gate 444 to thereby stop the REMEMBERED SECTOR COUNTER 430 to remember the address of the matching sector. As stated above the stopping of the SECTOR COUNTER 430 places the counters 428 and 430 out of step with each other so that the clock signal fails to emerge from the gate 436 and thereby stops the TRACK COUNTER 438. The stopping of the TRACK COUNTER maintains the address of that same track continuously on the bus wires 462 and prevents the drum storage from proceeding to a new track, whereby upon the next revolution of the drum the DRUM SECTOR COUNTER 428 will eventually match the count of the REMEMBERED SECTOR COUNTER 430 which is remembering the sector in which coincidence was found, namely, the empty sector. The matching of the two sector counters 428 and 430 causes the SECTOR COMPARATOR 440 to put out a WRITE COMMAND signal on wire 441 into the drum storage unit 120. It also puts out a SECTOR COMPARE signal, thereby enabling the upper input to the gate 348 as well as the upper input to the gate 344 whose lower input is enabled by the Q signal from the WRITE COINCIDENCE flipflop 340 which was set when the ALL NC signal came on after the PWR signal was delivered by the WRITE flipflop 332. Thus, the wire 345 is energized at the output of gate 344 and this wire enables the gate 322 to pass the bit clock through the gate and onto the PRI CONTROL wire of the gate 402. Since the lower input to this gate was also enabled by the SECTOR COMPARE wire, the PROGRAM COUNTER 400 begins counting upwardly at the beginning of the sector in which coincidence was found. This is the empty sector in which coincidence was made with an all-zero condition. The PROGRAM COUNTER first actuates the encoder 404 to encode the preamble which passes through the OR gate 406 to be entered via the DATA IN terminal of the storage drum unit 120 in response to the WRITE COMMAND signal on wire 441. When the preamble is completed the PWRT signal is decoded by the gate 416 which then enables the gate 410 to provide Bit Clock pulses through the OR gate 408 and onto the MOS CLK line which pulses pass through the gates 214 and 208 to commence clocking the Operand in the input buffer 200 to circulate. Since this buffer is clocked starting at the end of the preamble as detected by the gate 416, the contents of the input buffer 200 are circulated through the loop 211 in such a way that they are read out through the gate 304 and onto the wire 305, where they are delivered to and passed through the OR gate 406 and into the DATA In terminal of the drum storage unit 120. When the PROGRAM COUNTER reaches the end of the portion of the sector which is used for storage of the Operand, the decoder 416 removes the PWRT signal, thereby disabling the gate 410 and enabling the gate 412 to deliver Read Clock pulses while disabling the Data is being read into the drum. Thereafter, the encoder 417 enters a postamble through the OR gate 406 and into the DATA IN line going to the drum storage unit 120, and this postamble is then recorded on the storage drum.

The formerly-empty sector of the drum now has the information complete in it, and upon occurrence of the next sector clock, the LATCH signal on the gate 348 which appears on the wire 347 is clocked into the K terminal, and resets the WRITE flipflop to remove its Q signal and energize the NOT Q output which also resets the WRITE COINCIDENCE flipflop 340. As a result of this, the gate 322 becomes blocked and the PROGRAM COUNTER 400 stops counting, having returned to its original zero count. The PRI WRITE signal is also removed by the computer so that the PRI CLEAR signal disappears from the wire 349, thereby resetting the interrupt flipflop 360 and removing the PRI INT ALL signal. When this signal goes low, the gate 228 is energized to permit subsequent resetting of the search flipflops 230 and 232. The next INDEX CLK pulse from the drum storage unit 120 resets both SECTOR COUNTERS 428 and 430 so that they are once again in step with each other. The system is thus no longer in the priority mode, and the other remote stations are released to go into their NORMAL MODE of search for the purpose of retrieving information relating to the status of any credit account which appears on the drum.

In view of the fact that it is possible for the computer to command that something be done with cannot be accomplished, the flipflop 240, the unijunction one-shot 246, and the gates 238 and 242 are provided to inform the computer if a particular task is impossible. Whenever the system enters the priority interrupt mode, the PRI INT ALL signal enables one input to the gate 238. When that particular station is selected by the STA N signal, the gate 238 sets the flipflop 240 and energizes the unijunction one-shot 246. This one-shot is timed to remain energized during an interval sufficient to permit at least one complete search of the entire contents of the drum storage unit 120. At the end of this interval if the flipflop 240 has not been reset, time runs out and an output is delivered by the unijunction one-shot on the wire 247. However, if coincidence is found first the one-shot will be reset through the gate 242, such resetting occurring by a coincidence signal COIN entering through the OR gate 242. If the one-shot time runs out, a portion of its output on wire 247 passes through the gate 242 to reset the flipflop 240, and the ERASE and WRITE flipflops 230 and 232 and consequently the COINCIDENCE flipflops 336 and 340. Moreover, the output on wire 247 also resets the INTERRUPT flipflops in all units, such as the flipflops 360 and 364. However, the main purpose of the output on wire 247 is to deliver a SEARCH INVALID signal to the computer, which then commands that a whole new PRIORITY MODE be commenced. Examples of occasions on which time might run out at the unijunction one-shot without finding coincidence can include situations such as the case where the computer has ordered the system to erase an entry which in fact does not appear on the drum. Therefore, a system without the one-shot 246 could uselessly seek coincidence even though coincidence is impossible because the information in the input buffer 200 does not in fact match the information in any sector of the drum. Conversely, another case resulting in failure of the search would occur if the computer had ordered the system to enter information from the input buffer 200 into an empty sector when in fact there was no empty sector in the drum unit 120. In this case, a search would be conducted for a sector having all zeros, and such a search would of course be unsuccessful. In either event the unijunction one-shot oscillator 247 would run out of time after a sufficient interval had been allowed for a complete search of the drum, and the computer would be informed that what it had commanded could not be carried out.

Having thus illustrated and described one practical embodiment of the invention, we now make the following claims. The invention is not to be limited to the particular embodiment shown in the drawings because obviously the system can be altered within the scope of the claims to adapt it to different kinds of storage media and to many other uses besides the storage and retrieval of credit account information.

We claim:

1. A data file system for storing messages including information data identified uniquely by multi-bit operands and for presenting the stored operands and messages in serial fashion simultaneously at multiple remote places for selective message identification and retrieval thereat, comprising:

a. continuously cycling memory means having discrete message-storing locations which are read out sequentially bit-by-bit including the operand and the information data from each location, and the memory means having internally-generated output clock pulses synchronized with the read-out of the messages;

b. multiple participating stations coupled to said memory means and the stations being located at said remote places, each participating station including its own output message register connected to receive said read-out messages and including gating means controlling entry into the register of the read-out messages from the memory means, each participating station further including means for introducing a query operand and an input register for receiving the query operand, and each participating station further including comparator means coupled to receive the operands being read out from the memory locations and to receive the query operand circulating in the input register of the station and compare them for coincidence; and c. logic means in each station responsive to introduction of a query operand and responsive to said clock pulses to enable the comparator means during read-out of each memory operand and operative to circulate the query operand in the input register synchronously with the read-out operand, and said logic means further including coincidence-responsive means which is responsive to coincidence of said operands at said comparator means and to said pulses to control said gating means to prevent entry into said output register of further read-out messages and retain therein the message corresponding with said coincidence.

2. The system as set forth in claim 1, wherein the clock pulses generated in said memory means include location pulses marking each new location being read out, and said logic means for each station including bistable means controlling the coincidence-responsive means and operative in response to each new location pulse to reset the bistable means to a coincidence condition, said logic means being responsive to failure of operand coincidence during circulation of said query operand to set said bistable means to a condition indicating failure of coincidence; and said coincidence-responsive means including means responsive to the reset condition of the bistable means and to the next new location pulse to actuate said gating means to block further entry of information in the associated output register.

3. In a system as set forth in claim 2, said means in said coincidence-responsive means which is responsive to the reset condition of the bistable means and to said next new location pulse maintaining said gating means continuously blocked; and means responsive to the introduction of a new query operand into the input register of the same station to unblock said gating means.

4. In a system as set forth in claim 2, each stored message comprising an operand having a fixed number of bit positions, followed by information data; counter means for counting said fixed number of bit positions and operative in response to a clock pulse to commence counting at the beginning of the read-out of each operand and to reach its full count at the end of each operand; and means responsive to receiving said full count to disable subsequent operation of said comparator means.

5. The file system as set forth in claim 1, wherein the memory means includes means to write data into said separate storage locations, said write means being rendered operative by a command signal to write data into a location of said memory means; means at each station to initiate a command signal; counter means for repeatedly counting said memory locations to identify them as they are cyclically read-out; means in said logic means actuated in response to a query operand and to a command signal initiated at a given station and to operation of its coincidence-responsive means to retain in the counter means the memory location in which coincidence was found; means for entering the system into a priority mode including means for temporarily disabling the coincidence-responsive means of the other stations; means in said logic means responsive to a command signal for enabling said write means for writing data into that retained memory location during a subsequent cycle of the memory means; and means for releasing the system from the priority mode after said subsequent cycle.

6. In a system as set forth in claim 5, each participating station having in its logic means also other means for initiating a command signal which is a write command, and having means operative in response to a write command to introduce zeros into its comparator means for comparison with said operands being read out from the memory means thereinto, and operative upon a finding by its coincidence-responsive means of coincidence with an empty storage location to thereupon actuate said counter means to retain the memory location; and said means for entering the system into a priority mode including means for actuating said write means to write the contents of the input register means in said given station into said retained memory location during said subsequent cycle.

7. In a system as set forth in claim 5, each participating station having in its logic means also other means for initiating a command signal which is an erase command, and having means operative upon introducing of a query operand for comparison with operands readout from said storage locations and upon initiation of an erase command, and further operative upon said coincidence-responsive means indicating coincidence of said query operand with a readout operand, to actuated said counter means to retain that memory location, and said means for entering the system into the priority mode including means for actuating said write means to write zeros into the location during said subsequent cycle to erase its information.

8. In a system as set forth in claim 1, said memory means having in said message locations preamble bits stored together with said operands and with said information data to be read-out therewith at a fixed bit rate; means in each participating station upon entry of a query operand into the input register to actuate the logic means upon the occurrence of said preamble bits to circulate the operand in search of coincidence with the operand being read from the storage medium; timer means in the logic means initiated by said actuation thereof to time an interval sufficient to include one complete read-out of the memory means, and thereafter to disable the logic means; and means at each station and responsive to expiration of said interval in the absence of a finding of coincidence by said coincidence-responsive means to indicate absence of the information sought in the memory means.

9. In a system as set forth in claim 8, said memory means having postamble pulses at the end of each message stored in each of said locations; means in each participating station in the logic means and operative upon the finding of coincidence by said coincidence-responsive means and upon occurrence of said postamble pulses to control said gating means to retain in the output register data read from that memory location and to indicate the presence of the data in the output register.

10. In a system as set forth in claim 1, said memory means having multiple cyclically rotating tracks having multiple discrete information storing sectors each comprising one of said message locations, and said memory means for reading out the address of each sequentially recurring sector; and each participating station having means operative in a priority mode to write new data into a sector; means in all participating stations comprising a part of the logic means thereof for entering the station into the priority mode and including means for enabling a given station initiating said mode to write new data into a sector and means in the logic means for disabling the coincidence-responsive means in the other stations; and means in the logic means and operative in said given station when in said priority mode to retain the address of a sector when coincidence is detected by its coincidence-responsive means between the operand read from a sector and a query operand entered in its input register; and means to actuate said write means to write new data into that sector.

11. In a system as set forth in claim 10, means in the logic means and operative in said priority mode to recognize an empty sector being read out from the memory means and to retain its address; and means responsive to the next cyclic recurrence of said readout address to write into that sector an operand and information data contained in said input register.

12. In a system as set forth in claim 10, erase means in said logic means and operative in a given station in said priority mode, in response to a finding of coincidence by the coincidence-responsive means between a read-out operand and a query operand in the input register indicating a sector to be erased, to actuate said means in the logic means to retain the address of that sector; and means operative upon the next recurrence of said retained address to actuate said means to write new data to write all zeros in that sector to erase the information contained therein.

* * * * *